(12) United States Patent
Wang

(10) Patent No.: US 9,851,750 B2
(45) Date of Patent: Dec. 26, 2017

(54) METHOD FOR VIEWING A PRESENTATION DOCUMENT IN A MOBILE DEVICE AND A SYSTEM THEREOF

(71) Applicants: ZHUHAI KINGSOFT OFFICE SOFTWARE CO., LTD., Guangdong (CN); BEIJING KINGSOFT OFFICE SOFTWARE, INC., Beijing (CN)

(72) Inventor: Hui Wang, Guangdong (CN)

(73) Assignees: Zhuhai Kingsoft Office Software Co., Ltd., Beijing (CN); Beijing Kingsoft Office Software, Inc., Beijing (CN)

( * ) Notice: Subject to any disclaimer, the term of this patent is extended or adjusted under 35 U.S.C. 154(b) by 242 days.

(21) Appl. No.: 14/389,942

(22) PCT Filed: Mar. 15, 2013

(86) PCT No.: PCT/CN2013/072664
§ 371 (c)(1),
(2) Date: Oct. 1, 2014

(87) PCT Pub. No.: WO2013/149545
PCT Pub. Date: Oct. 10, 2013

(65) Prior Publication Data
US 2015/0091946 A1  Apr. 2, 2015

(30) Foreign Application Priority Data

Apr. 1, 2012 (CN) .......................... 2012 1 0096121

(51) Int. Cl.
*G09G 5/00* (2006.01)
*G06F 1/16* (2006.01)
*G09G 5/08* (2006.01)

(52) U.S. Cl.
CPC ............. *G06F 1/1626* (2013.01); *G09G 5/00* (2013.01); *G09G 5/08* (2013.01); *G06F 2200/1614* (2013.01); *G09G 2340/0492* (2013.01)

(58) Field of Classification Search
CPC .. G06F 3/04886; G06F 17/211; G06F 3/0482; G06F 3/0485; G06F 2200/1614;
(Continued)

(56) References Cited

U.S. PATENT DOCUMENTS 6,310,648 B1 * 10/2001 Miller ................ H04N 5/23293
348/333.05
6,976,228 B2 * 12/2005 Bernhardson ......... G06F 3/0482
715/786
(Continued)

FOREIGN PATENT DOCUMENTS

CN          1808364 A       7/2006
JP       2009032173 A       2/2009

OTHER PUBLICATIONS

Let Documents Fly—Official Release of Kingsoft Office Mobile Version 4.0, Computer & Network, Sep. 2011, No. 18, p. 25.

*Primary Examiner* — Robert Craddock
(74) *Attorney, Agent, or Firm* — Schwabe Williamson & Wyatt, PC

(57) ABSTRACT

Provided are a method for viewing a presentation document in a mobile device and a system thereof. The method includes the steps of: determining an orientation of screen according to a sensing signal from a gravity sensor; displaying slide thumbnails of the presentation document at the lower part of the screen in a horizontal arrangement when the screen orientation is portrait; and displaying the slide thumbnails of the presentation document at the left part or the right part of the screen in a vertical arrangement when the screen direction is landscape. When a user opens a
(Continued)

presentation document, the method for viewing a presentation document in a mobile device according to the present invention switches display mode of slide thumbnails in the presentation document automatically according to the screen orientation sensed by a gravity sensor, thereby being able to display the slide thumbnails in a more suitable manner according to different screen orientations, and facilitating the viewing and operation of the presentation by a user. The display manner in the method of the present invention better conforms to the psychological expectation of users, and can result in a better user experience.

2 Claims, 2 Drawing Sheets

(58) Field of Classification Search
CPC  G06F 1/1626; G09G 2340/0492; G09G 5/08; G09G 5/00
See application file for complete search history.

(56) References Cited

U.S. PATENT DOCUMENTS

| | | | |
|---|---|---|---|
| 8,896,632 B2 * | 11/2014 | MacDougall | G06F 1/1626 345/173 |
| 2011/0221667 A1 | 9/2011 | Lee | |

* cited by examiner

METHOD FOR VIEWING A PRESENTATION DOCUMENT IN A MOBILE DEVICE AND A SYSTEM THEREOF

TECHNICAL FIELD

The present invention relates to the field of document processing technology in a mobile device, and particularly to a method for viewing a presentation document in a mobile device, as well as a system thereof.

BACKGROUND

With the development and the application of mobile processing devices such as smart phones, tablet PCs and the like are increasingly widespread, there have been special softwares being able to open a presentation document in mobile devices. When using a mobile device, the screen orientation of the mobile device often needs to be set to landscape or portrait so as to find the most appropriate viewing angle.

However, for various existing softwares for opening a presentation document in a mobile device, the display mode for the thumbnails of the presentation document will not change as the screen orientation of the mobile device changes after the presentation document is opened. This brings great inconvenience to users of mobile devices, resulting in poor user experience and usability.

SUMMARY OF THE INVENTION

Technical Solution

A technical problem to be solved by the present invention is to provide a method for viewing a presentation document in a mobile device in a more convenient and usable way.

A method for viewing a presentation document in a mobile device includes the steps of: determining an orientation of a screen according to a sensing signal from a gravity sensor; displaying thumbnails of slides in the presentation document at the lower part of the screen in a horizontal arrangement when the orientation of the screen is portrait; and displaying the thumbnails of the slides in the presentation document at the left part or the right part of the screen in a vertical arrangement when the orientation of the screen is landscape.

In comparison with the prior art, the method for viewing a presentation document in a mobile device according to the present invention switches the display mode of the thumbnails of slides in the presentation document automatically according to the orientation of the screen sensed by the gravity sensor when a user opens a presentation document. Therefore it is possible to display the thumbnails of slides in the presentation document in a more suitable manner according to different orientation of the screen, facilitating the viewing and operating of the presentation document by a user. Furthermore, the display mode in the method according to the present invention is more conformable to the psychological expectation of users, bringing better user experience.

In an embodiment, when the orientation of the screen is portrait, the switching mode of the slides is further set as left/right sliding switching; and when the orientation of the screen is landscape, the switching mode of the slides is further set as up/down sliding switching.

By the above-mentioned switching mode, when the orientation of the screen of a mobile device changes, not only the display position of a presentation document is switched, but also the switching mode of the thumbnails of the presentation document is further changed. Therefore, it is more convenient to users, and the operation by a user is more conformable to the psychological expectation of the user, resulting in better user experience.

In an embodiment, when the orientation of the screen is portrait, the display mode of the slides is further switched to an imagery mode; and when the orientation of the screen is landscape, the display mode of the slides is further switched to a scenery mode.

With the above method, when the orientation of the screen of a mobile device changes, a self-adaptive switching of the display mode of the slides is further achieved for displaying the slides to users in a more suitable display mode, thus further improving the user experience.

A technical problem to be solved by the present invention is further to provide a system for viewing a presentation document in a mobile device in a more convenient and usable way.

A system for viewing a presentation document in a mobile device includes: an orientation sensing module and a thumbnail display switching module, wherein the orientation sensing module is used to determine an orientation of a screen according to a sensing signal from a gravity sensor; and the thumbnail display switching module is used to display thumbnails of slides in the presentation document at the lower part of the screen in a horizontal arrangement when the orientation of the screen is portrait, and to display the slide thumbnails of the presentation document at left part or right part of the screen in a vertical arrangement when the orientation of the screen is landscape.

In comparison with the prior art, in the system for viewing a presentation document in a mobile device according to the present invention, the orientation sensing module determines the orientation of the screen according to the sensing signal from the gravity sensor when a user opens a presentation document; and the thumbnail display switching module displays the slide thumbnails of the presentation document at the lower part of the screen in a horizontal arrangement when the orientation of the screen is portrait, and displays the slide thumbnails of the presentation document at the left part or the right part of the screen in a vertical arrangement when the orientation of the screen is landscape. Therefore, it is possible to display the slide thumbnails of the presentation document in a more suitable manner according to different orientations of the screen, facilitating the viewing and operating of the presentation document by a user. The display mode in the method according to the present invention is more conformable to the psychological expectation of the user, resulting in better user experience.

In an embodiment, the system for viewing a presentation document in a mobile device further includes a sliding switching module for slides, which is used to set the switching mode of the slides as left/right sliding switching mode when the orientation of the screen is portrait; and to set the switching mode of the slides as up/down sliding switching mode when the orientation of the screen is horizontal.

In another embodiment, the system for viewing a presentation document in a mobile device further includes a display mode switching module, which is used to set the display mode of the slides as an imagery mode when the orientation of the screen is portrait; and to set the display mode of the slides as a scenery mode when the orientation of the screen is landscape.

DESCRIPTION OF EMBODIMENTS

Figure 1:
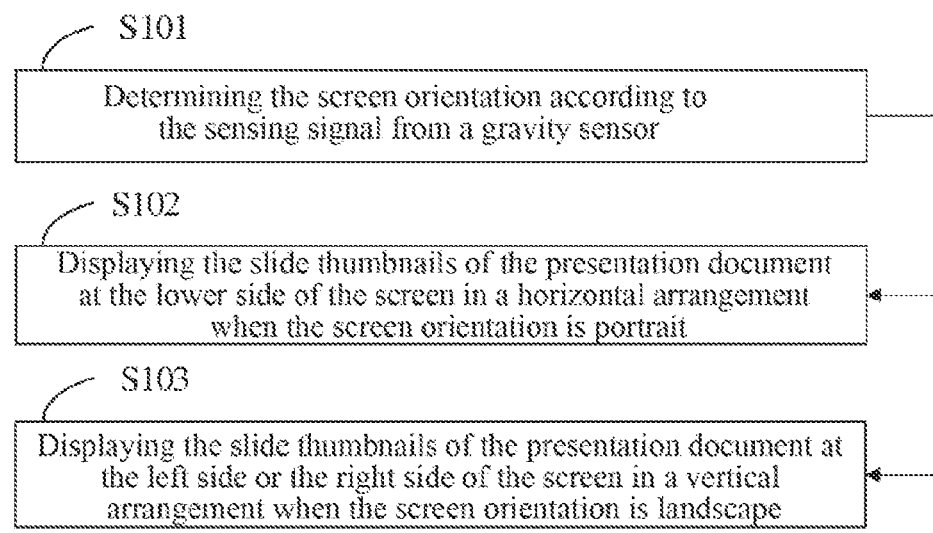
FIG. 1 is a schematic flow diagram of a method for viewing a presentation document in a mobile device according to the present invention.

Reference can be made to FIG. 1, which is a schematic flow diagram of a method for viewing a presentation document in a mobile device according to the present invention.

The method for viewing a presentation document in a mobile device includes the following steps:

Step S101: determining an orientation of a screen according to a sensing signal from a gravity sensor.

The method for viewing a presentation document in a mobile device according to the present invention is started when a user chooses to open a presentation document with a document processing software (such as WPS) or the like.

At first, the sensing signal from the gravity sensor of the mobile device is obtained, according to which whether the current orientation of the screen of the mobile device is portrait or landscape is determined. Since there are relatively well-established methods in the prior art for determining the orientation of the screen according to the sensing signal from a gravity sensor of a mobile device, the specific method for performing this step in the present invention is not listed herein.

Step S102: displaying the thumbnails of slides in the presentation document at lower part of the screen in a horizontal arrangement when the orientation of the screen is portrait.

When the orientation of the screen is determined to be portrait, i.e. the viewing angle of a user typically becomes a portrait orientation, the thumbnails of the slides contained in the presentation document is displayed at the lower part of the screen in a horizontal arrangement.

Particularly, since the main body of the slide is displayed, generally in the middle of the screen, at the same time when the thumbnails are displayed, and the size of the main body of the slide displayed is much larger than that of the thumbnails, the main body of the slide can be displayed in the middle of the screen or at the upper part of the screen, and the thumbnails is displayed at a position at the lower part of the screen outside of the main body of the slide.

Since the orientation of the screen is portrait and the thumbnails are displayed at the lower part of the screen, there is still a large spare space in the middle of the screen and at the upper part of the screen, so that the displaying of the thumbnails will not occupy the display position of the main body of the slide of the presentation document, and the user can perform display switching by clicking a thumbnail displayed at the lower part.

Step S103: displaying the slide thumbnails of the presentation document at the left part or the right part of the screen in a vertical arrangement when the orientation of the screen is landscape.

When the orientation of the screen is determined to be landscape, i.e. the viewing angle of a user typically becomes a landscape orientation, the thumbnails of the slides contained in the presentation document is displayed at the left part or the right part of the screen in a vertical arrangement.

Similarly, the main body of a slide can be displayed in the middle of the screen, and the thumbnails are displayed at the left part or the right part of the screen at a position outside of the main body of the slide. Since the orientation of the screen is landscape and the thumbnails are displayed at the left part or the right part of the screen, there is still a large spare space in the middle of the screen, so that the display of the thumbnails does not occupy the display position of the slide main body of the presentation document, and the user can perform display switching by clicking the thumbnails displayed at the left part or the right part.

The method for viewing a presentation document in a mobile device according to the present invention determines the orientation of the screen according to the sensing signal from a gravity sensor when a user opens a presentation document; displays the thumbnails of the slides in the presentation document at the lower part of the screen in a horizontal arrangement when the orientation of the screen is portrait; and displays the thumbnails of the slides of the presentation document at the left part or the right part of the screen in a vertical arrangement when the orientation of the screen is landscape. Therefore, it is possible to display the slide thumbnails of the presentation document in a more suitable manner according to different orientations of the screen, facilitating the viewing and operating of the presentation document by a user. The display mode in the method according to the present invention is more conformable to the psychological expectation of the user, resulting in better user experience.

In an embodiment, when the orientation of the screen is portrait, the switching mode of the slides is further set as left/right sliding switching; and when the orientation of the screen is landscape, the switching mode of the slides is further set as up/down sliding switching.

When the orientation of the screen is portrait, the slide thumbnails are displayed at the lower part of the screen in a horizontal arrangement, and the slide can be displayed in the middle of the screen or at the upper part of the screen. Therefore, the switching mode of the slides can be set as left/right sliding switching, so that the displaying of the slide main body will not be blocked when the sliding switching is performed. Similarly, when the orientation of the screen is landscape, the slide thumbnails are displayed at the left part or the right part of the screen in a vertical arrangement. Therefore, the switching mode of the slides can be set as up/down sliding switching, so that the display of the slide main body will not be blocked when the sliding switching is performed.

In another embodiment, when the orientation of the screen is portrait, the display mode of the slides is further switched to an imagery mode; and when the orientation of the screen is landscape, the display mode of the slides is further switched to a scenery mode. With the above-mentioned method, when the orientation of the screen of a mobile device changes, a self-adaptive switching of the display mode of the slides is further achieved for displaying the slides to users in a more suitable display mode, thus further improving the user experience.

Figure 2:
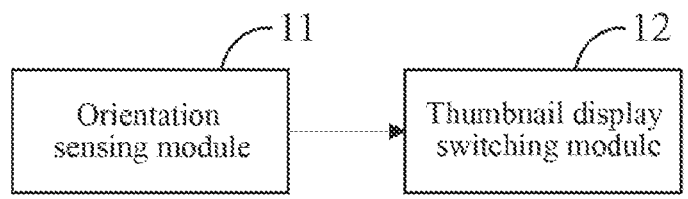
FIG. 2 is a schematic structure diagram of a system for viewing a presentation document in a mobile device according to the present invention.

Reference can be made to FIG. 2, which is a schematic structure diagram of a system for viewing a presentation document in a mobile device according to the present invention.

The system for viewing a presentation document in a mobile device includes: an orientation sensing module 11 and a thumbnail display switching module 12. The orientation sensing module 11 is used to determine the orientation of a screen according to the sensing signal from a gravity sensor; and the thumbnail display switching module 12 is used to display the slide thumbnails of the presentation document at the lower part of the screen in a horizontal arrangement when the orientation of the screen is portrait, and to display the slide thumbnails of the presentation document at the left part or the right part of the screen in a vertical arrangement when the orientation of the screen is landscape.

The system for viewing a presentation document in a mobile device according to the present invention is started when a user chooses to open a presentation document with a document processing software (such as WPS) or the like.

At first, the orientation sensing module 11 obtains the sensing signal from the gravity sensor of the mobile device, and determines whether the current orientation of the screen of the mobile device is portrait or landscape according to the sensing signal. Since there are relatively well-established methods in the prior art for determining the orientation of the screen according to the sensing signal from the gravity sensor of a mobile device, the specific determining methods are not listed herein.

When the orientation of the screen is determined to be portrait, i.e. the viewing angle of a user typically becomes a portrait orientation, the thumbnail display switching module 12 displays the thumbnails of the slides contained in the presentation document at the lower part of the screen in a horizontal arrangement.

Particularly, since the main body of the slide is displayed, generally in the middle of the screen, at the time when the thumbnails are displayed, and the size of the slide main body displayed is much larger than that of the thumbnail, the thumbnail display switching module 12 can display the main body of the slide in the middle of the screen or at the upper part of the screen, and the thumbnails are displayed at the lower part of the screen at a position outside of the slide main body.

Since the orientation of the screen is portrait, and the thumbnails are displayed at the lower part of the screen, there is still a large spare space in the middle of the screen and at the upper part of the screen, so that the display of the thumbnails does not occupy the display position of the slide main body of the presentation document, and a user can perform display switching by clicking the thumbnails displayed at the lower part.

When the orientation of the screen is determined to be portrait, i.e. the viewing angle of a user typically becomes a portrait orientation, the thumbnail display switching module 12 displays the thumbnails of the slides contained in the presentation document at the left part or the right part of the screen in a vertical arrangement.

Similarly, the thumbnail display switching module 12 can display the main body of the slide in the middle of the screen, and the thumbnails are displayed at the left part or the right part of the screen at a position outside of the slide main body. Since the orientation of the screen is landscape and the thumbnails are displayed at the left part or the right part of the screen, there is still a large spare space in the middle of the screen, so that the display of the thumbnails does not occupy the display position of the slide main body of the presentation document, and a user can perform display switching by clicking the thumbnails displayed at the left part or the right part.

In the system for viewing a presentation document in a mobile device according to the present invention, the orientation sensing module determines the orientation of the screen according to the sensing signal from a gravity sensor when a user opens a presentation document; and the thumbnail display switching module displays the slide thumbnails of the presentation document at the lower part of the screen in a horizontal arrangement when the orientation of the screen is portrait, and displays the slide thumbnails of the presentation document at the left part or the right part of the screen in a vertical arrangement when the orientation of the screen is landscape. Therefore, it is possible to display the thumbnails in a more suitable manner according to different orientation of the screen, facilitating the viewing and operating of the presentation document by a user. The display mode in the method according to the present invention is more conformable to the psychological expectation of the user, resulting in better user experience.

Figure 3:
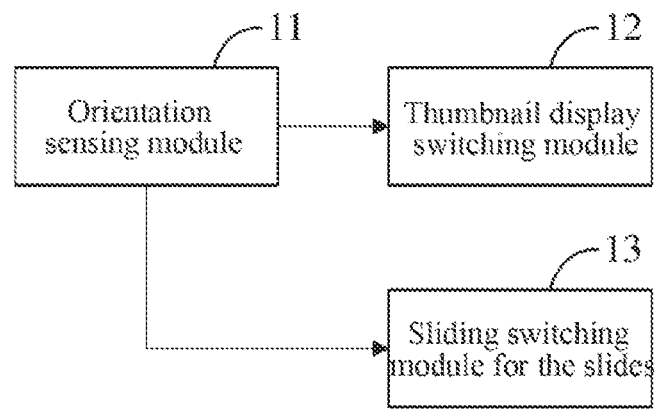
FIG. 3 is a schematic structure diagram of an embodiment of the system for viewing a presentation in a mobile device according to the present invention.

Reference can be made to FIG. 3, which is a schematic structure diagram of an embodiment of the system for viewing a presentation document in a mobile device according to the present invention.

In an embodiment, the system for viewing a presentation document in a mobile device according to the present invention further includes a sliding switching module for the slides 13, which is used to set the switching mode of the slides as left/right sliding switching when the orientation of the screen is portrait; and to set the switching mode of the slides as up/down sliding switching when the orientation of the screen is landscape.

When the orientation of the screen is portrait, the slide thumbnails are displayed at the lower part of the screen in a horizontal arrangement, and the slide is displayed in the middle of the screen or at the upper part of the screen. Therefore, the sliding switching module for the slides 13 sets the switching mode of the slides as left/right sliding switching, so that the display of the slide main body will not be blocked when the sliding switching is performed. Similarly, when the orientation of the screen is landscape, the slide thumbnails are displayed at the left part or the right part of the screen in a vertical arrangement. The switching mode of the slides can be set as up/down sliding switching, so that the display of the slide main body will not be blocked when the sliding switching is performed.

Figure 4:
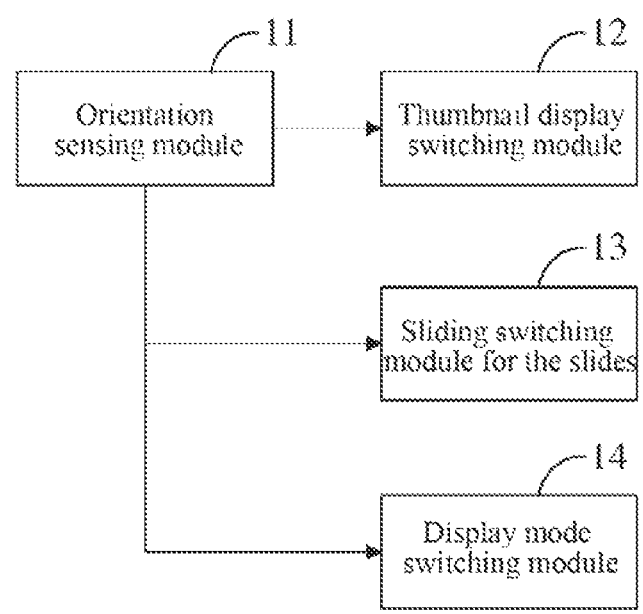
FIG. 4 is a schematic structure diagram of another embodiment of the system for viewing a presentation document in a mobile device according to the present invention.

Reference can be made to FIG. 4, which is a schematic structure diagram of another embodiment of the system for viewing a presentation document in a mobile device according to the present invention.

In another embodiment, the system for viewing a presentation document in a mobile device according to the present invention further includes a display mode switching module 14, which is used to switch the display mode of the slides to an imagery mode when the orientation of the screen is portrait; and to switch the display mode of the slides to a scenery mode when the orientation of the screen is landscape. When the orientation of the screen of a mobile device changes, a self-adaptive switching of the display modes for the slides is further achieved by the display mode switching module 14 for displaying the slides to users in a more suitable display mode, thus further improving the user experience.

The embodiments of the present invention described above are not intended to limit the scope of the present invention. Any modifications, equivalent substitutions, improvements or the like made within the spirit and principle of the present invention shall be included in the protection scope of the claims in the present invention.

The invention claimed is:

1. A method for viewing a presentation document in a mobile device, characterized in that the method comprises the steps of:
   determining an orientation of a screen according to a sensing signal from a gravity sensor;
   displaying thumbnails of slides in the presentation document at lower part of the screen in a horizontal arrangement when the orientation of the screen is portrait; and
   displaying the thumbnails of the slides in the presentation document at left part or right part of the screen in a vertical arrangement when the orientation of the screen is landscape;
   wherein switching mode of a slide on focus is set as left/right sliding switching when the orientation of the screen is portrait; and the switching mode of the slide on focus is set as up/down sliding switching when the orientation of the screen is landscape, so that displaying of a slide main body is not blocked when sliding switching is performed;
   wherein display mode of the slide on focus is switched to a portrait mode when the orientation of the screen is portrait; and the display mode of the slide on focus is switched to a landscape mode when the orientation of the screen is landscape.

2. A system for viewing a presentation document in a mobile device, characterized in that the system comprises:
   an orientation sensing module, which is used to determine an orientation of a screen according to a sensing signal from a gravity sensor;
   a thumbnail display switching module, which is used to display thumbnails of slides in the presentation document at lower part of the screen in a horizontal arrangement when the orientation of the screen is portrait; and to display the thumbnails of the slides in the presentation document at left part or right part of the screen in a vertical arrangement when the orientation of the screen is landscape; and
   a sliding switching module for the slides, which is used to set switching mode of a slide on focus as left/right sliding switching when the orientation of the screen is portrait; and to set the switching mode of the slide on focus as up/down sliding switching when the orientation of the screen is landscape, so that displaying of a slide main body is not blocked when sliding switching is performed;
   the system further comprises a display mode switching module, which is used to switch display mode of the slide on focus to a portrait mode when the orientation of the screen is portrait; and to switch the display mode of the slide on focus to a landscape mode when the orientation of the screen is landscape.

* * * * *